US006914884B2

United States Patent
Matsuo et al.

(10) Patent No.: US 6,914,884 B2
(45) Date of Patent: Jul. 5, 2005

(54) COMMUNICATION CONTROL CIRCUIT

(75) Inventors: Syuji Matsuo, Kanagawa (JP); Kiyoshi Tanaka, Kanagawa (JP)

(73) Assignee: NEC Electronics Corporation, Kawasaki (JP)

( * ) Notice: Subject to any disclaimer, the term of this patent is extended or adjusted under 35 U.S.C. 154(b) by 987 days.

(21) Appl. No.: 09/840,967

(22) Filed: Apr. 25, 2001

(65) Prior Publication Data
US 2001/0036227 A1 Nov. 1, 2001

(30) Foreign Application Priority Data
Apr. 26, 2000 (JP) .................................. 2000-125453

(51) Int. Cl.[7] .............................................. G01R 31/38
(52) U.S. Cl. ................................... 370/249; 370/251
(58) Field of Search ............................. 370/241–253, 370/389–394, 438, 362; 710/305, 306; 714/25, 47, 48; 375/224

(56) References Cited

U.S. PATENT DOCUMENTS

| 5,787,114 A | * | 7/1998 | Ramamurthy et al. ...... 375/221 |
| 6,560,200 B1 | * | 5/2003 | Shinozuka ................... 370/241 |
| 6,578,095 B1 | * | 6/2003 | Tanaka et al. .............. 710/100 |

FOREIGN PATENT DOCUMENTS

| JP | 9-214502 | 8/1997 |
| JP | 10-170606 | 6/1998 |
| JP | 11-4240 | 1/1999 |

OTHER PUBLICATIONS

Motohiko Inad "An Introduction to IEEE Standard 1394", Second Edition, Chapter 2, Gijyutsu–Hyoron Co. Ltd.

* cited by examiner

Primary Examiner—Bob Phunkulh
Assistant Examiner—Ian N. Moore
(74) Attorney, Agent, or Firm—McGinn & Gibb, PLLC

(57) ABSTRACT

The invention provides a communication control device that includes a self-diagnostic test circuit capable of executing an operation test. The communication control circuit includes a PHY circuit on an LSI with little trouble, and at a operating speed that is equivalent to actual operation. The self-diagnostic test circuit includes: test data creation circuit for creating test data; expected value data creation circuit for creating expected values of the test data after processing; an arbitration signal switching circuit that switches arbitration signals such that test data supplied from the output driver can be received by a receiver of the same twisted-pair drive block as the output driver; and a comparison circuit that compares test data supplied from an output driver and received by a receiver of the same twisted-pair drive block as the output driver with the expected value data and creates match flags.

7 Claims, 17 Drawing Sheets

Fig. 4 Prior Art

| arbitration transmit | | Line state name |
|---|---|---|
| Arb_a_TX | Arb_b_TX | |
| Z | Z | IDLE |
| Z | 0 | TX_REQUEST |
| | | TX_GRANT |
| 0 | Z | TX_PARENT_NOTIFY |
| 0 | 1 | TX_DATA_PREFIX |
| 1 | Z | TX_CHILD_NOTIFY |
| | | TX_IDENT_DONE |
| 1 | 0 | TX_DATA_END |
| 1 | 1 | BUS_RESET |

Fig. 5 Prior Art

| arbitration Receive | | Line state name |
|---|---|---|
| Arb_a_RX | Arb_b_RX | |
| Z | Z | IDLE |
| Z | 0 | RX_PARENT_NOTIFY |
| | | RX_REQUEST_CANCEL |
| Z | 1 | RX_IDENT_DONE |
| 0 | Z | RX_SELF_ID_GRANT |
| | | RX_REQUEST |
| 0 | 0 | RX_ROOT_CONTENTION |
| | | RX_REQUEST |
| 0 | 1 | RX_PARENT_HANDSHAKE |
| | | RX_DATA_END |
| 1 | Z | RX_CHILD_HANDSHAKE |
| 1 | 0 | RX_DATA_PREFIX |
| 1 | 1 | BUS_RESET |

Fig. 8

Prior Art

| arbitration transmit ||State of FIFO|
|---|---|---|
| Arb_a_TX | Arb_b_TX ||
| Z | Z | Inactive |
| Z | O | Inactive |
| Z | 1 | Inactive |
| O | Z | Inactive |
|||Inactive|
| O | O | Inactive |
|||Inactive|
| O | 1 | Inactive |
| 1 | Z | Inactive |
| 1 | O | Active |
| 1 | 1 | Inactive |

US 6,914,884 B2

COMMUNICATION CONTROL CIRCUIT

BACKGROUND OF THE INVENTION

1. Field of the Invention

The present invention relates to a communication control circuit, and particularly to a communication control circuit including a physical layer driver circuit (PHY circuit) in compliance with the IEEE (Institute of Electrical and Electronic Engineers) Standard 1394.

2. Description of the Related Art

Recent years have seen the development of a variety of bus standards for personal computer peripheral devices as computer interfaces. These bus standards for personal computer peripheral device include USB (Universal Serial Bus) standards and high-performance serial bus standards pursuant to IEEE Standard 1394. IEEE Standard 1394 is a standard for a high-speed serial bus that was developed principally by Apple Computer, Inc. This standard specifies physical and electrical standards for cables and connectors for interconnecting a wide range of devices including home-appliances, and defines international standards relating to protocol for realizing peer-to-peer communication between a maximum of 63 nodes.

The layer configuration of an IEEE 1394 serial bus is composed of three layers: a transaction layer, a link layer (hereinbelow referred to as "LINK"), and a physical layer (hereinbelow referred to as "PHY").

The transaction layer executes transaction processing for asynchronous communication between the application layer and the node of a communication partner.

The link layer receives asynchronous instructions or data from the transaction layer, or receives isochronous instructions or data from the application layer, divides the received data into packets and transfers the packets to the physical layer, and assembles packets received from the physical layer into data and transfers the data to an upper layer.

The role of the PHY is to convert the data that are transferred from the LINK in the form of packets to electrical signals of a communication format that is pursuant to IEEE Standard 1394 and transmit the packets to the node of the transmission destination, and to transfer communication received from other nodes to the application layer of the transmission destination through the LINK of interest, or to transfer (repeat) to another node of the transmission destination. For this purpose, the chief electrical functions of the PHY circuit is the transmission and reception of packets and also bus arbitration.

IEEE Standard 1394 includes not only the specifications of electrical signals, but also mechanical specifications for cables and connectors. PHY circuit has the function of physically connecting the port of a node of interest with the port of a transmission destination node by way of connectors and cables pursuant to these mechanical specifications, i.e., the function of mechanical interfacing between the node and connectors and cables in accordance with IEEE Standard 1394.

IEEE Standard 1394 specifies half-duplex operation as the communication mode. In this communication mode, only one port executes packet transmission on an IEEE 1394 serial bus.

This half-duplex communication mode is performed using differential signals (signals that are symmetric with respect to the ground potential) of data signals and differential signals of strobe signals, the strobe signals being created by inverting the odd numbered bits of data signals. This encoding method of strobe signals is referred to as the data-strobe encoding method.

According to this data-strobe encoding method, a continuously transmitting data signal can be detected even in a case in which a signal of the same logic level continues on the data line and thus the electric potential of the data line is fixed, because the strobe signal changes. When the data-strobe encoding method is adopted, clocks are reproduced by exclusive-OR processing of data and strobe signals. The use of these reproduced clocks eliminates the need for a complicated clock extraction circuit on the receiving side and can reduce the clock skew of received data. Further, differential signals are used in order to remove noises introduced in the bus.

Arbitration is a process for assigning the right or priority to use a serial bus to each port. The arbitration method adopted in an IEEE 1394 serial bus is a method that guarantees that only one port sends data, i.e., a method that guarantees half-duplex processing.

A PHY circuit can have a plurality of ports for transmitting and receiving packets. In a cable environment, the ports of each PHY circuit are interconnected one-to-one by cables.

Ports and cables are driven by a tristate differential-output line driver of a low-voltage current mode. This line driver generates differential outputs from input signals. Each of the component signals of a differential signal can take on three states, i.e., 0 1 and "Z." In this case, "Z" signifies the idle state or a non-driven state.

A cable that conforms to IEEE Standard 1394 is a four-wire or a six-wire cable. FIG. 1 shows a sectional view of a six-wire cable 401 that conforms to IEEE Standard 1394. A four-wire cable is made up by two twisted-pair cables, i.e., twisted-pair A (Tpa) cable 403 and twisted-pair B (Tpb) cable 405. The six-wire cable 401 includes the above-described two twisted-pair cables 403 and 405 and two power-supply lines for supplying power 402 and 404.

FIG. 2 shows a port of a PHY circuit for driving a cable including cable drive block for driving twisted pair A (hereinbelow abbreviated as "TPA drive block") and cable drive block for driving twisted pair B (hereinbelow abbreviated as "TPB drive block"). This cable-drive port is explained, for example, M. Inada, "Introduction to IEEE Standard 1394 " Second Edition, Chapter 2 (Gijyutsu-Hyoron Co. Ltd.).

As its essential elements, TPA drive block 500 is provided with line driver (hereinbelow referred to as "driver") 502, line receiver (hereinbelow referred to as "receiver") 503, and arbitration comparators 504 and 505.

As its essential elements, TPB drive block 520 is also provided with driver 522, receiver 523, and arbitration comparators 524 and 525.

As shown in FIG. 2, ground terminal VG and the two sets of terminals, terminals TPA and TPA* of TPA drive block 500 and terminals TPB and TPB* of TPB drive block 520 constitute an interface between the PHY circuit and the cables. When connecting two nodes, terminals TPA and TPA* of the TPA drive block of a first node are connected to terminals TPB and TPB* of the TPB drive block of a second node; and terminals TPB and TPB* of the TPB drive block of the first node are connected to terminals TPA and TPA* of the TPA drive block of the second node.

This way of connection of the twisted pair cables is hereinafter referred to as "cross-connected".

When enable signal Strb_Enable is active, driver 502 for transmitting strobe signals Strb_Tx supplies a differential signal made up of a noninverted output signal of the same phase as input signal Strb_Tx and an inverted output signal of the reverse phase to terminals TPA and TPA*. Similarly, when enable signal Data_Enable is active, driver 522 for transmitting data signal Data_Tx of the TPB drive block supplies a differential signal made up of a non-inverted output signal of the same phase as input signal Data_Tx and an inverted output signal of the reverse phase to terminals TPB and TPB*.

Receiver 503 for receiving data signal Data_RX of the TPA drive block 500 differential-detects data signal Data_RX that is received by way of terminals TPA and TPA*. Receiver 523 for receiving strobe signals Strb_RX of the TPB drive block 520 differential-detects strobe signal Strb_RX that is received by way of terminals TPB and TPB*.

Arbitration comparators (504 and 505) of the TPA drive block 500 and arbitration comparators (524 and 525) of the TPB drive block 520 are each made up by two differential amplifiers having differing transition threshold values and each detect the tristate logical values of the Tpa cables and Tpb cables. These detected values, Arb_a and Arb_b, are used as arbitration control signals for bus-arbitration.

The TPA drive block provides Tp Bias. Tp Bias is supplied by way of operational amplifier 501 of a voltage-follower connection, and is in turn supplied to the TPA wire and TPA* wire by way of resistors 509 and 510. Tp Bias is grounded (denoted by VG) at terminal 512 through smoothening capacitor 511.

Differential amplifier 506 serves as a speed signal detector and detects the reception speed of packets. The packet transmission speed is designated by a speed signal Speed_TX, which controls the output currents of constant-current supplies 531 and 532 provided between TPB cable and VG 535 in the transmission-side TPB drive block at the time of Data_Prefix before transmission of packets.

Speed signal Speed_TX causes a bias current to flow between the TPA and TPA* of the reception-side TPA drive block. Capacitor 533 and resistor 534 make up a smoothening circuit.

The bias current, which corresponds to speed signal Speed_TX, flows through serial resistors 507 and 508 of the TPA drive block of the reception node and generates a voltage between TPA and TPA*. This voltage is divided by resistors 507 and 508, and the divided voltage is detected by differential amplifier 506 by comparing the divided voltages with Tp Bias to produce reception speed signal Speed_RX.

Differential amplifier 526 of the transmission drive block TPB compares voltages that are generated by dividing the bias voltage of the TPB cables by means of resistors 527 and 528 with reference voltage 0.8 V and detects the connection state between the drive block of interest and the node of the communication partner.

In the case of asynchronous transmission, which is one mode of IEEE 1394 communication, the transmission PHY circuit adds, in response to the transmission request (Request) of the LINK, a transmission data prefix signal (TX_DATA_PREFIX) at the beginning of a packet data signal and a transmission data end signal (TX_DATA_END) at the end of the packet data signal, as arbitration signals.

TX_DATA_PREFIX indicates the transmission start, and TX_DATA_END indicates the transmission end in accordance with the IEEE 1394 Std.

FIG. 3 shows an example of a timing chart illustrating the packet data signals that flow during transmission. FIGS. 4 and 5 are correspondence charts between the line states and the transmission arbitration codes (transmission arbitration control signals) and reception arbitration codes (reception arbitration control signals) defined in the IEEE 1394 Standard. Of the arbitration control signals and line states represented in FIGS. 4 and 5, the following points are of key importance in the explanation hereinbelow.

Referring to FIG. 4, the transmission prefix signal TX-DATA-PREFIX (transmission prefix signals added to the data and strobe signals) is detected to be Arb_a=0 and Arb_b=1 by arbitration comparators in the TPA and TPB drive blocks, respectively, on the transmission side.

Arb_a=0 and Arb_b=1 detected by arbitration comparators of the transmission node are interpreted by the bus arbitration block of the same transmission node as a reception end signal RX-DATA-END (cf. FIG. 5) which causes the reception block of the transmission node to be deactivated.

In this way, simultaneous occurrence of transmission and reception in a PHY circuit can be avoided to realize the half-duplex operation.

It is to be noted that the same transmission prefix signal is detected to be Arb_a=1 and Arb_b=0 by arbitration comparators in the PHY circuit of a reception node, because TPA and TPB terminals of a transmission node are cross-connected to TPB and TPA terminals of the reception node. For this reason, the transmission prefix signal sent from the transmission node is received by the reception node as a reception prefix signal RX-DATA-PREFIX (cf. FIG. 5) which causes the reception block of the reception node to be activated.

Referring again to FIG. 3, the figure shows that logic 0 and logic 1 are prefixed to a transmission strobe signal and a transmission data signal, respectively, as an arbitration signal TX-DATA-PREFIX. The arbitration signal is detected by arbitration comparators in the TPA and TPB drive blocks, which issues arbitration control signals, Arb_a=0 and Arb_b=1. The arbitration control signals are interpreted as RX-DATA-END by the transmission PHY circuit to cause the reception block of the transmission PHY circuit to be deactivated.

In FIG. 3, logic 1 and logic 0 suffixed to transmission strobe signal Strb_Tx and transmission data signal Data_Tx, respectively, as arbitration signal TX_DATA_END are detected to be Arb_a=1 and Arb_b=0 by arbitration comparators of the transmission node. These arbitration control signals, Arb_a=1 and Arb_b=0, are interpreted by the transmission PHY circuit as RX_DATA_PREFIX which causes reception of packet data to be allowed. In this way, when transmission of packet data ends, reception of packet data is allowed.

FIG. 6 is a timing chart showing packet data signals in the reception node. Since the Tp (twisted-pair) terminals of both ends of a Tp cable are cross-connected as described hereinabove, the line state Arb_a=0 and Arb_b=1 of the transmission node is detected as line state Arb_a=1 and Arb_b=0 in the reception node. Accordingly, the reception PHY circuit judges the arbitration signal Arb_a=1 and Arb_b=0 as the reception data prefix signal, Rx_Data_PREFIX, that indicates the start of reception (refer to FIG. 5). As a result, the reception PHY circuit activates its reception block, and receives the packet data. In this way, the reception PHY circuit, when receiving TX_DATA_PREFIX, starts reception of the packet data signal transmitted from the transmission node.

The arbitration comparators of the reception PHY circuit, upon detecting TX_DATA_END suffixed to the transmitted packet data signal, provides outputs of Arb_a=0 and Arb_b=1, which are an arbitration signal indicating the end of the reception (cf. FIG. 5). Whereby, the reception node stop receiving the packet data signal.

While Arb_a=1 and Arb_b=0 indicate RX_DATA_PREFIX as a reception arbitration signal (cf. FIG. 5), they also indicate TX_DATA_END as a transmission arbitration signal (cf. FIG. 4).

Thus, the reception PHY circuit, upon receiving Arb_a=1 and Arb_b=0 from its arbitration comparators, controls its transmission block to block the transmission of a packet data signal, thereby preventing the simultaneous reception and transmission of packet data signals.

While Arb_a=0 and Arb_b=1 indicate RX_DATA_END as a reception arbitration signal (cf. FIG. 5), they also indicate TX_DATA_PREFIX as a transmission arbitration signal (cf. FIG. 4).

The reception PHY circuit, upon receiving Arb_a=0 and Arb b=1 suffixed to the received packet data, judges the arbitration signal to be TX_DATA_PREFIX.

Thus, when transmission packet data are present, execution of transmission is guaranteed as soon as the reception of packet data ends.

The entire PHY circuit is next explained with reference to the figures. FIG. 7 is a block diagram showing the overall PHY circuit.

Referring now to FIG. 7, PHY circuit 1100 is made up by: cable drive block 129, transmission block 115, reception block 120, bus arbitration block 119, LINK interface block 111, local clock generation circuit 105, parallel/serial converters (P/S circuits) 123 and 124, serial/parallel converter (S/P circuit) 125, and clock reproduction circuit 128.

LINK interface block 111 interfaces communication of packet data and arbitration between a LINK circuit (not shown in the figure) and PHY circuit 1100. Cable drive block 129 is made up by low-voltage and low-current circuits such as drivers 130, 134, receivers 131, 135, and arbitration comparators 132, 136.

Arbitration comparators (hereinbelow abbreviated as "Arb Comp") 132 and 136 perform differential-detection of arbitration signals added at the beginning and end of packet data transmitted or received, and judge their logical level. Arb Comps 132 and 136 supply to bus arbitration block 119 the judgment results, i.e., Arb_a and Arb_b that represent the line states of the TPA cable and TPB cable, respectively.

Drivers 130, 134 transmit packet data, and receivers 131, 135 receive packet data.

Bus arbitration block 119 responds to arbitration requests from LINK interface block 111, manages and controls each port, and performs the reset and configuration of the bus pursuant to the IEEE Std 1394.

Reception block 120 takes in data transmitted from the bus and synchronizes the data to a synchronizing clock signal. The synchronization is performed by clock reproduction circuit 128 and FIFO 122. Clock reproduction circuit 128 includes Exclusive-OR gate 126 and frequency demultiplier (FD) 127. Exclusive-OR gate 126 receives reception data signal Data_Rx and reception strobe signal Strb_Rx and generates a clock signal that is synchronized with the reception signals. Frequency demultiplier 127 frequency-demultiplies the clock signal that was generated by Exclusive-OR gate 126 and supplies the frequency-demultiplied clock to FIFO 122. The frequency-demultiplied clock is hereinafter referred to as a reproduced clock signal.

Under the control of reception control circuit 121, FIFO 122 stores parallel reception data signal Data_Rx supplied by way of S/P 125 in synchronization with the reproduced clock signal. The read-out of data from FIFO 122 is performed in synchronization with the synchronizing clock supplied from local-clock generator circuit 105 under the control of reception control circuit 121. The clock skew between the received data and the synchronizing clock can thus be absorbed and received data can be synchronized with the synchronizing clocks. The received data that are read out from FIFO 122 are both sent through output buffer 108 to an upper layer circuit and applied to selector (SEL) of transmission block 115.

Transmission control circuit (Transmission CTRL CCT) 118 of transmission block 115 receives bus control signals from bus arbitration block 119, controls the output of drivers 130 and 134 in accordance with the instructions of the bus control signals, and controls the selection of SEL 116.

SEL 116 receives both packet data signal 101 provided by way of LINK interface block 111 and the received data that are read out from FIFO 122, and selects one of these inputs in accordance with a selection control signal. The output of SEL 116 is supplied to data-strobe encoding circuit 117. As will be explained hereinbelow with reference to FIG. 9, data-strobe encoding circuit 117 generates transmission strobe signal Strb_Tx based on data signals. Transmission strobe signal Strb_Tx is sent by way of P/S circuit 123 to driver 130. Data-strobe encoding circuit 117 also transmits packet data signals 101 received from the LINK or the received data that have been read out from FIFO 122 to driver 134 by way of P/S circuit 124 as transmission data signal Data_Tx. The arbitration signals, TX_DATA_PREFIX and TX_DATA_END, are added to both of the transmission strobe signal and the transmission data signal in Data-strobe encoding circuit 117.

The received data that have been read from FIFO 122 are repeated to another PHY circuit in case in which the received data are selected by SEL 116.

Explanation next concerns the operation of the PHY circuit shown in FIG. 7.

Transmission request 102 given from a LINK circuit (not shown) is taken in by buffer 114 of LINK interface block 111 and sent to bus arbitration block 119.

PHY circuit generates arbitration signal TX_DATA_PREFIX for transmitting data, and in a case in which the right or priority to use the bus has been obtained, takes packet data signal 101 in data-strobe encoding circuit 117 of transmission block 115 by way of buffer 109 and buffer 1113 of LINK interface block 111, and generates a strobe signal.

This data-strobe encoding circuit 117 inverts the odd-numbered bits of the data signals and generates strobe signals (refer to FIG. 9 and data-strobe encoding method).

The strobe signal, added with arbitration signals, i. e., TX DATA_PREFIX and TX DATA_END, to form transmission strobe signal Strb_Tx, is converted from parallel data to serial data at P/S circuit 123. The transmission strobe signal Strb_Tx is sent to a destination node from twisted pair A terminals TPA and TPA*. Transmission data signal Data_Tx also undergoes parallel/serial conversion at P/S circuit 124 and is transmitted to the destination node from twisted pair B terminals TPB and TPB*.

The connection of cables between the two PHY circuits is carried out as follows.

Twisted pair A terminals TPA and TPA* of a first PHY circuit connect to twisted pair B terminals TPB and TPB* of a second PHY circuit. TX_DATA_PREFIX that has been transmitted is therefore converted to data reception arbitration Rx_Data_PREFIX on the reception side, and data Data_Tx transmitted from twisted pair A terminals TPB and TPB* are received as Data_Rx by the TPA drive block on the reception side.

Received Data_Rx are converted to parallel signals by S/P circuit 125 of reception block 120 of the reception side and then synchronized to reproduced clocks and taken into FIFO 122. The data that have been taken into FIFO 122 are transmitted by way of output buffer 108 to an upper layer circuit or, in a case of selection by SEL 116, relayed to the next node.

In a case in which the PHY circuit of a node has a plurality of ports, the node can be connected to other nodes as a branch node. The node can also be connected as the parent node to other children nodes. In such a case, data are repeated by way of the bus. Data are thus transferred in a bucket brigade mode.

Packet data that are transmitted from driver 130 and driver 134 of the cable driver block are received by receivers 131 and 135 of the same port.

As can be understood from FIGS. 4 and 5, however, arbitration control signals Arb_a and Arb_b are identical for TX_DATA_PREFIX and RX_DATA_END. Bus arbitration block 119 therefore judges TX_DATA_PREFIX detected when transmitting packet data, as RX_DATA_END, and bus arbitration block 119 therefore deactivates FIFO 122. In this way, the feedback of packet data is blocked when transmitting packet data. In other words, simultaneous transmission and reception at one port is prevented.

FIG. 8 shows the relation between arbitration control signals and the output signals of bus arbitration block 119. Bus arbitration block 119 controls reception control circuit 121 in response to arbitration control signals and modifies the FIFO state.

In FIG. 8, when arbitration control signals Arb_a_TX and Arb_b_TX ("_TX" denotes "transmission") are 0 and 1, respectively, i. e., at the time of TX_DATA_PREFIX, the FIFO state is "inactive", and reception is thus prevented during transmission. When arbitration control signals Arb_a_TX and Arb_b_TX are 1 and 0, respectively, i. e., at the time of RX_DATA_PREFIX and TX_DATA_END, the FIFO state is "active", and reception is thus enabled when transmission ends. This relation can also be judged in accordance with the arbitration codes of FIGS. 4 and 5.

According to FIGS. 4 and 5, arbitration control signals Arb_a=0 and Arb_b=1 correspond to TX_DATA_PREFIX as transmission arbitration code, but corresponds to RX_DATA_END as reception arbitration code.

Arbitration control signals Arb_a=1 and Arb_b=0 correspond to TX_DATA_END as transmission arbitration signal, and also correspond to RX_DATA_PREFIX as reception arbitration signal. Thus, when Arb_a=1 and Arb_b=0, the transmission circuit is deactivated, the reception circuit is activated, and the FIFO state becomes "active."

Except in cases in which the arbitration control signals are Arb_a=1 and Arb_b=0, the FIFO state is made "inactive" and reception is disabled.

FIG. 9 shows the construction of one example of the data-strobe encoding circuit 117, and FIG. 10 shows a timing chart of data-strobe encoding.

The data-strobe encoding circuit 117 is provided with a data inversion unit and selectors 1209 and 1210.

The data inversion unit receives one-byte (from the 0 bit to the seventh bit) of parallel data signal 1207 and inverts the odd-numbered bits, i.e., the first, third, fifth, and seventh bits, at inverters 1202, 1203, 1204, and 1205.

Selector 1209 is made up by output buffer 0 for sending out strobe data that have been generated by the data inversion unit and also output buffer 1 for sending out arbitration signal 1206 that is added to the strobe data. The selection of strobe data or an arbitration signal is controlled by control signal 1208 that is provided from a transmission control circuit.

Selector 1210 is made up by output buffer 0 for sending out data signals and output buffer 1 for sending out arbitration signal 1207 that is added to the data. The selection of data signals or arbitration signals is controlled by control signal 1208 that is provided from the transmission control circuit.

FIG. 10 shows that transmission strobe signal Strb_TX is generated by inverting the first, third, fifth and seventh bits of transmission data signal Data_TX.

FIG. 10 also shows that clock signal CLK is generated from transmission strobe signal Strb_TX and transmission data signal Data_TX by Exclusive-OR gate 126 of clock reproduction circuit 128 of FIG. 7.

In addition to the normal mode for performing ordinary packet communication, communication control circuits typically operate in a test mode to test whether or not the communication control circuit is operating normally.

FIG. 11 is a block diagram for explaining one example of a test method of a communication control device for the communication control pursuant to IEEE Standard 1394.

This method is realized by performing a transmission operation and reception operation to two nodes each provided with LINK circuits and PHY circuits. This method is to be referred to as a first test method of the prior art.

In FIG. 11, the first node is provided with LINK circuit 1501 and PHY circuit 1503. The second node is provided with LINK circuit 1502 and PHY circuit 1504. External controller 1500, which is an application layer device, is connected to LINK circuit 1501 and LINK circuit 1502.

External controller 1500 is provided with test data for checking whether or not LINK circuits 1501 and 1502 and PHY circuits 1503 and 1504 are operating normally.

External controller 1500 checks whether the LINK circuits and PHY circuits are operating normally by sending the test data to one of the LINK circuits and receiving test data from the other LINK circuit and then comparing the sent test data and the received test data.

In more concrete terms, the test data from external controller 1500 is transmitted to LINK circuit 1501 and this test data are transmitted to PHY circuit 1503. PHY circuit 1503, when receiving the test data, transmits the test data to IEEE 1394 cable 1505.

PHY circuit 1504 receives the test data by way of IEEE 1394 cable 1505 and transmits the test data to LINK circuit 1502.

Having received the test data, LINK circuit 1502 transmits the test data to external controller 1500.

Testing LINK circuits and PHY circuits according to the first test method of the prior art therefore not only requires that test data be transmitted to LINK circuits and PHY circuits, but further requires an external controller for receiving test data that have been processed by the LINK circuits and PHY circuits. This method of the prior art is therefore problematic due to its complexity.

A testing method that improves on the first method of the prior art to meet the demand for a simplified test is described in, for example, Japanese Patent Laid-open No. 4240/99.

In this method, an external controller that supplies test data is provided inside an LSI as a test circuit. This method is described below as a second test method of the prior art.

FIG. 12 is a block diagram of a communication control device for the second test method of the prior art.

The communication control circuits that are the objects of testing are an LSI that includes LINK circuit 1601 and PHY circuit 1603 and an LSI that includes LINK circuit 1602 and PHY circuit 1604. The external controller is incorporated as test circuit 1600 in at least one of the LINK circuits. During testing, PHY circuits 1603 and 1604 are connected by cable 1605 and test circuit 1600 carries out the transmission and reception of test signals by control from outside the LINK circuits.

During a test, test data are transmitted from a test circuit inside one of the LINK circuits, and the test data that have been transmitted by way of a PHY circuit, a cable, a PHY circuit, and a LINK circuit are compared with the original test data supplied from the test circuit 1600 at an external logic analyzer circuit.

As the cable, a cable is used that conforms with IEEE Standard 1394 used in normal operation.

The use of this cable, however, causes the problem that tests on each of the LSI are more difficult, and there has consequently been demand for operation tests that are performed on each LSI.

A semiconductor device that meets this demand is described in, for example, Japanese Patent Laid-open No. 170606/98. Wiring and switches that take the place of a cable are provided within an LSI. This method is referred to hereinbelow as the third test method of the prior art.

FIG. 13 is a circuit diagram of an LSI for realizing a third method of the prior art.

This LSI incorporates first port PRT1 and second port PRT2. First port PRT1 is provided with input/output terminal T1, driver (DRV1) 1711 for transmitting data signal TXD1 from terminal T1, and receiver (RCV1) 1712 for receiving data signal RXD1 from terminal T1. Driver 1711 is controlled by transmission control signal TXE1, and receiver 1712 is controlled by reception control signal RXE1.

Second port PRT2 is also provided with input/output terminal T2, driver (DRV2) 1713 for transmitting data signal TXD2 from terminal T2, and receiver (RCV2) 1714 for receiving data signal RXD2 from terminal T2. Driver 1713 is controlled by transmission control signal TXE2, and receiver 1714 is controlled by reception control signal RXE2.

Switch (on-resistance=Rsw) 1710 is provided between first port PRT 1 and second port PRT2 for switching between connection/disconnection of these two ports, the connection of switch 1710 being controlled by control signal CNT. Termination resistors 1701 and 1702 of resistance R0 are connected to terminals T1 and T2.

When testing, a loopback test can be performed by connecting switch 1710, whereby a test can be performed on the LSI.

However, since wiring and switches are provided between the ports, this test circuit has the problem that the parasitic capacitance of the wiring and switches obstructs high-speed operation during normal operation.

Although it is possible to use an LSI tester capable of high-speed operation to perform a test on an LSI at a high speed equivalent to normal speed, such LSI testers that operate at high speed are expensive.

It is an object of the present invention to provide a communication control circuit that can easily perform an operation test of a communication control circuit that includes a PHY circuit on a low-speed LSI and at a high speed equivalent to normal operation.

SUMMARY OF THE INVENTION

To achieve the above-described objects, the communication control circuit has a physical layer circuit in conformity with IEEE Standard 1394.

The physical layer circuit is provided with: cable drive circuit for driving an IEEE 1394 cable pursuant to the IEEE Standard 1394 and receiving a signal from the cable, the cable drive circuit having first and second cable drive circuit for driving first and second twisted pair cables of the IEEE 1394 cable, the first cable drive circuit having first terminals for communicating with the first twisted pair cable, first driver for driving the first twisted pair cable through the first terminals, first receiver for receiving signals applied to the first terminals, and a first arbitration comparator for detecting a state of a line connected with the first terminals, the result of detection being a first arbitration control signal, and the second cable drive circuit having second terminals for communicating with the second twisted pair cable, a second driver for driving the second twisted pair cable through the second terminals, second receiver for receiving signals applied to the second terminals, and a second arbitration comparator for detecting a state of a line connected with the second terminals, the result of detection being a second arbitration control signal; bus arbitration circuit for controlling transmission and reception of packet data to manage bus arbitration in accordance with the IEEE Standard 1394 based on the first and second arbitration control signals; transmission circuit for generating a transmission strobe signal and a transmission data signal to transmit through the first and second drivers respectively under control of the bus arbitration circuit; and reception circuit for receiving outputs of the first and second receivers under control of the bus arbitration circuit and supplying predetermined one of the outputs of the first and second receivers as an output.

The physical layer circuit is further provided with a self-diagnosis circuit for diagnosing the physical layer circuit.

The self-diagnosis circuit comprises a test data creation circuit, a reference circuit, a comparison circuit, a test control circuit, an arbitration signal switching circuit, and a selector circuit.

The test data creation circuit is intended to create a test data signal and a transmission command.

The reference circuit is intended to provide expected value data signals. The expected value data signals refer to the signals that are expected to be caused in the case in which test data signals are subject to the same processing as in the normal operation mode of the physical layer circuit without any error.

The comparison circuit is intended to compare the output of the reference circuit with the test data signal processed by the physical layer circuit and notify the results of the comparison.

The test control circuit is intended to provide an operation mode switching signal in accordance with an externally supplied test control signal for commanding execution of a self-diagnostic test.

The arbitration signal switching circuit receives first and second arbitration signals, and, when the operation mode switching signal designates the test operation mode, exchanges the values of the first and second arbitration signals and supplies the result to the bus arbitration circuit.

The selector circuit includes: an output control circuit for transferring the transmission commands to the bus arbitration circuit when the operation mode switching signal designates the test operation mode and blocking transmission of the transmission commands to the bus arbitration circuit when the operation mode switching signal designates the normal operation mode; and a selection circuit for transferring the test data signal to the transmission circuit when the operation mode switching signal designates the self-diagnostic test mode, and blocking transmission of the test data signal when the operation mode switching signal designates the normal operation mode.

It is preferred that the predetermined one of the outputs is the output of the first driver which is received by the first receiver and the reference circuit is a data-strobe encoding circuit for performing data-strobe encoding of the test data signal.

It is also preferred that the predetermined one of the outputs is the output of the first driver which is received by the first receiver and the reference circuit is a memory that stores the test strobe signal created by the transmission circuit.

The arbitration signal switching circuit is preferably provided with a first 2-1 selector and a second 2-1 selector each for selecting either a first input or a second input according to an operation mode switching signal provided by the test control circuit, the first arbitration control signal is supplied to both the first input of the first 2-1 selector and the second input of the second 2-1 selector, the second arbitration control signal is supplied to both the second input of the first 2-1 selector and the first input of the second 2-1 selector, and the outputs of the 2-1 selectors are provided to the bus arbitration circuit.

A method of self-diagnosing a physical layer circuit is directed to a physical layer circuit configured in conformity with IEEE Standard 1394 and provided with first and second drivers for driving an IEEE 1394 twisted pair cable through first and second terminals, respectively, and first and second receivers for receiving signals applied to the first and second terminals, respectively.

The method comprises steps of:
disjoining the IEEE 1394 twisted pair cable from communication terminals of the physical layer circuit
creating expected value data signals, wherein the expected value data signals are the signals that are expected to be caused in the case in which test data signals are subject to the same processing as in the normal operation mode of the physical layer circuit without any error,
creating a test strobe signal from a test data signal by DS-LINK bit level encoding,
producing a transmission test strobe signal and a transmission test data signal by adding arbitration signals to the test strobe signal and the test data signal, respectively,
transmitting the transmission test strobe signal and the transmission test data signal through the first driver and the second driver of the physical layer circuit, creating a first arbitration control signal and a second arbitration control signal from the outputs of the first driver and the second driver by the same processing of the arbitration signals as the corresponding processing in the normal operation mode of the physical layer circuit of interest,
processing the first arbitration control signal and the second arbitration control signal to produce a third arbitration control signal and a fourth arbitration control signal so that the line state specified by a set of the third and fourth arbitration control signals will permit, in accordance with the Specification of the IEEE 1394 Standard, predetermined one of the outputs of the first receiver and the second receiver to feedback, as a fed-back test signal, to an internal signal-reception circuit of the physical layer circuit of interest through the same signal-reception processing as in the normal operation mode of the physical layer circuit,
comparing the fed-back test signal to the expected value data signal, and
notifying the result of the comparing as a result of the self-diagnosis.

The set of the first arbitration control signal and the second arbitration control signal specifies a line state that prohibits the feedback of the predetermined one of the outputs, and the step of processing the first arbitration control signal and the second arbitration control signal includes a step of exchanging the values of the first arbitration control signal and the second arbitration control signal to replace the first arbitration control signal with the second arbitration control signal as the third arbitration control signal and also replace the second arbitration control signal with the first arbitration control signal as the fourth arbitration control signal.

The first receiver and the second receiver preferably provides, as outputs, the transmission test strobe signal and the transmission test data signal, respectively, the predetermined one of the outputs is a transmission test strobe signal, and the expected value data signal is a test strobe signal created from a test data signal by DS-LINK bit level encoding.

In the present invention, an operation test of the actual operation level is possible because there is no need to add a circuit for testing to the cable drive block.

An operation test and also tests other than an operation test can therefore be conducted on the same LSI, whereby the number of steps can be reduced compared to loopback tests that were heretofore performed using special devices, and the number of steps of overall tests can be decreased.

While the number of steps that can be eliminated varies according to the environment in which the test device is arranged, the number of steps can presumably be reduced by half even when considering man-hours.

The above and other objects, features, and advantages of the present invention will become apparent from the following description referring to the accompanying drawings which illustrate examples of preferred embodiments of the present invention.

BRIEF DESCRIPTION OF THE DRAWINGS

FIG. 4 shows arbitration code during transmission.

FIG. 5 shows arbitration code during reception.

FIG. 8 shows the arbitration control signals and output signals of the bus arbitration circuit.

DETAILED DESCRIPTION OF THE PREFERRED EMBODIMENTS

Turning now to the accompanying figures, the first embodiment of the present invention is next explained.

Figure 7:
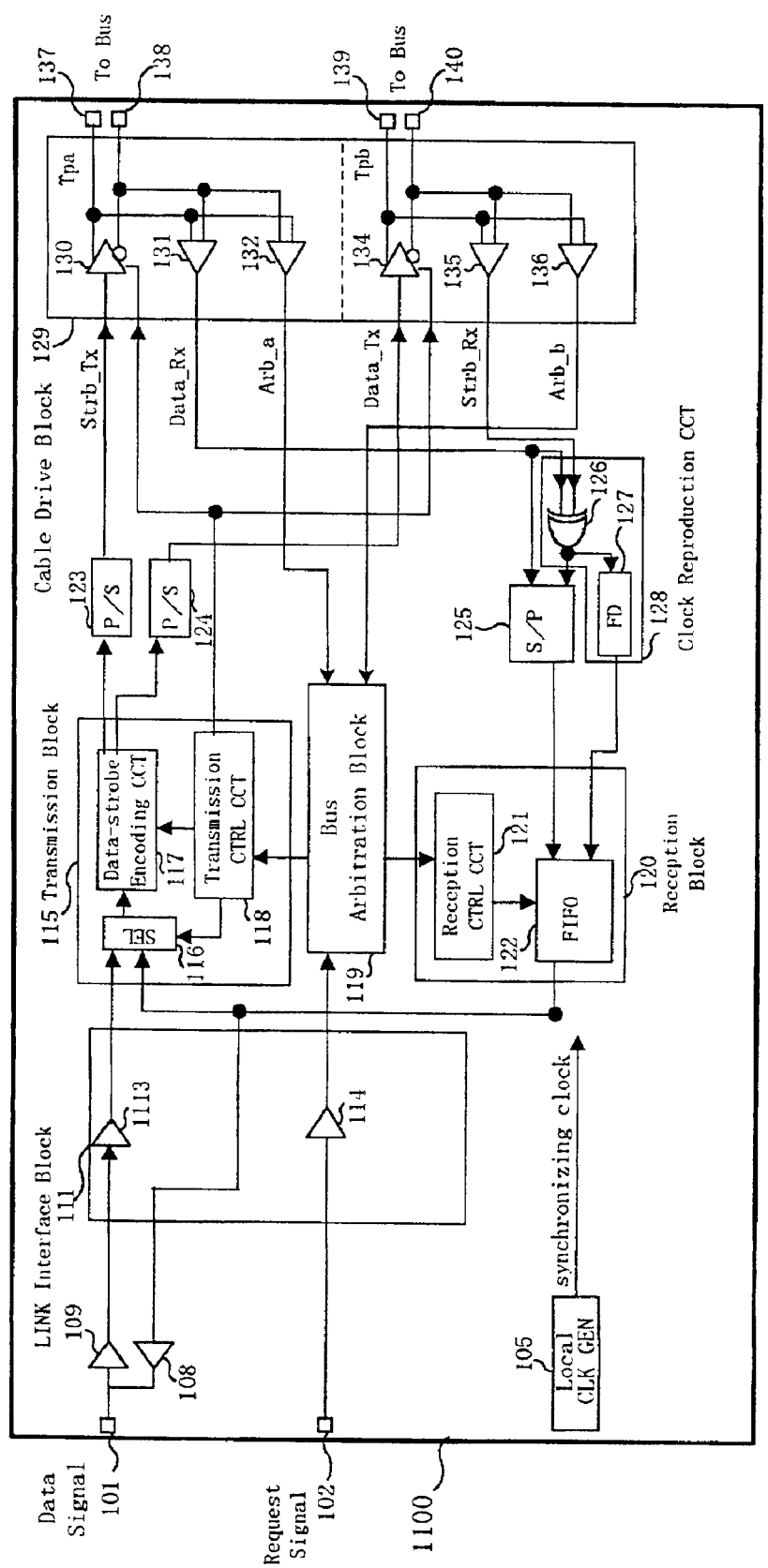
FIG. 7 is a block diagram of a communication control circuit of the prior art.
Figure 9:
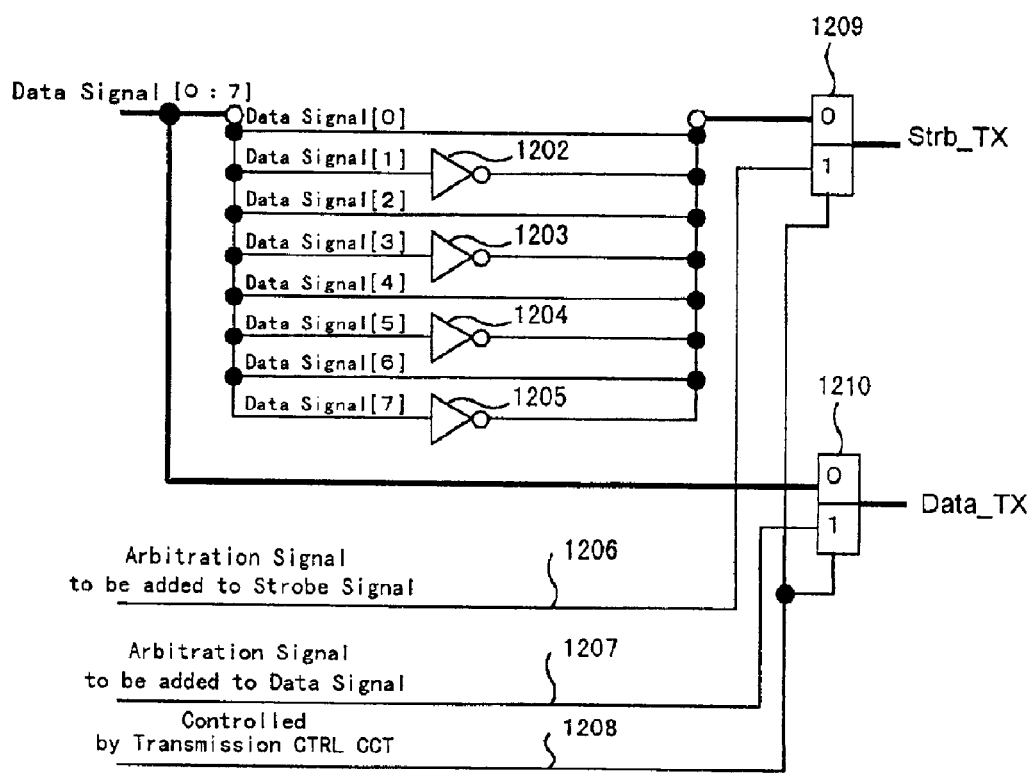
FIG. 9 is a block diagram of a data-strobe encoding circuit.
Figure 10:
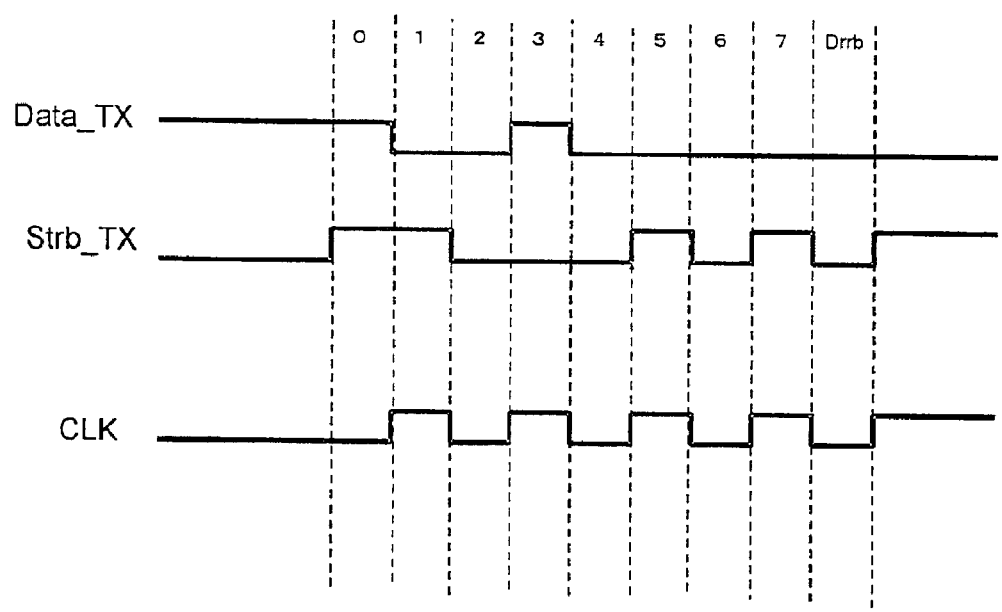
FIG. 10 is a timing chart of the encoding method.
Figure 11:
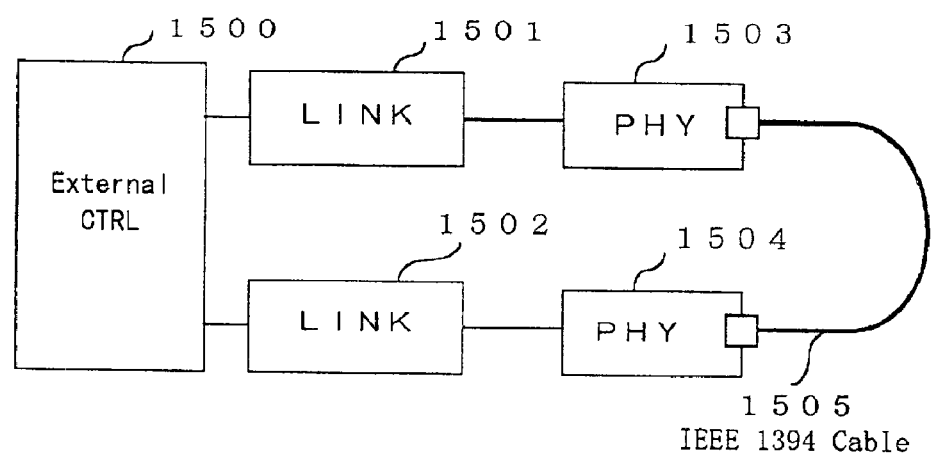
FIG. 11 is a block diagram for explaining a first example of a test method of a communication control device.
Figure 12:
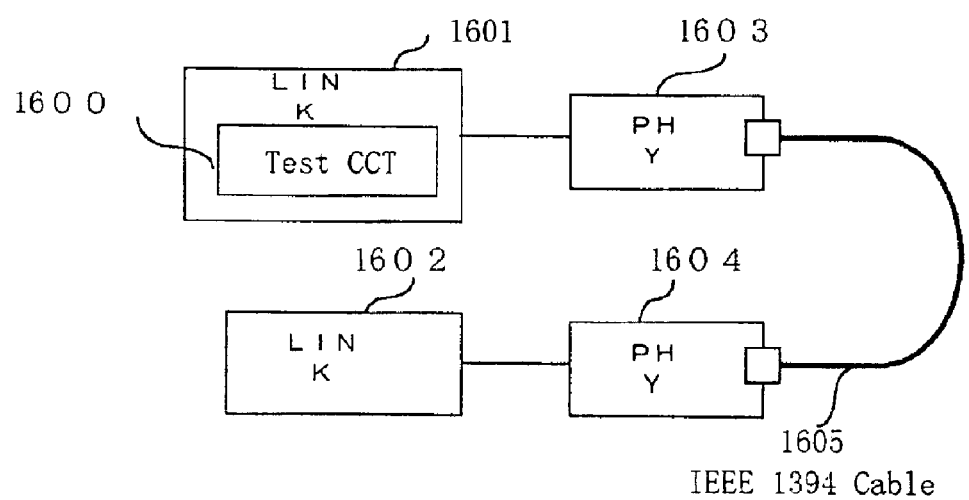
FIG. 12 is a block diagram for explaining a second example of a test method of a communication control device
Figure 13:
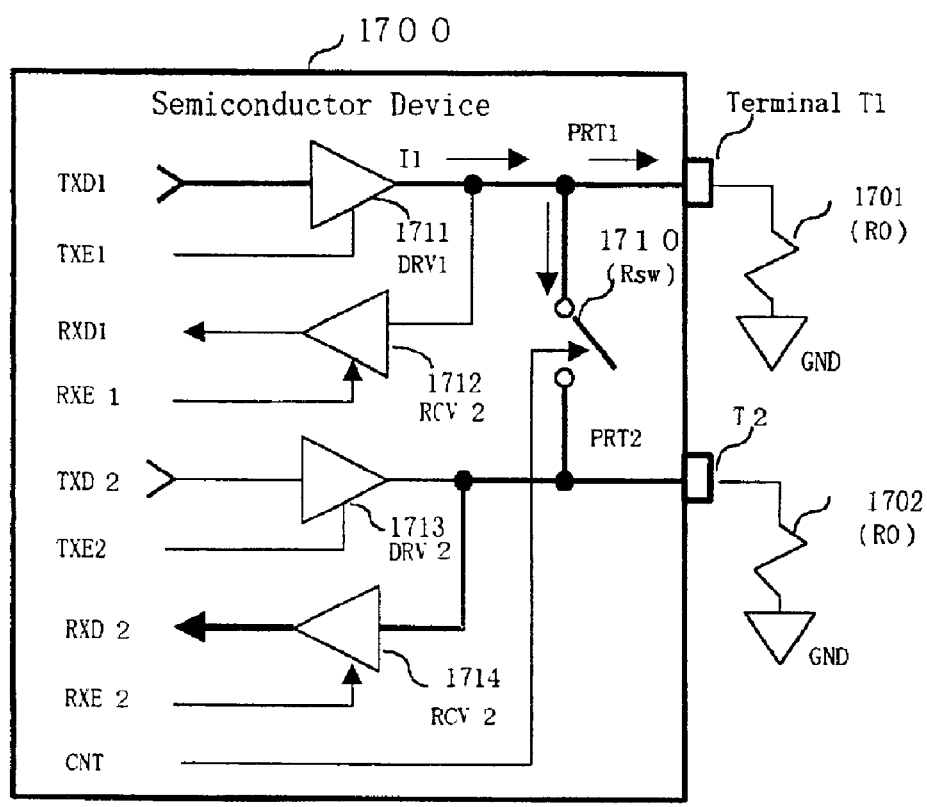
FIG. 13 is a block diagram for explaining a third example of a test method of a communication control device
Figure 14:
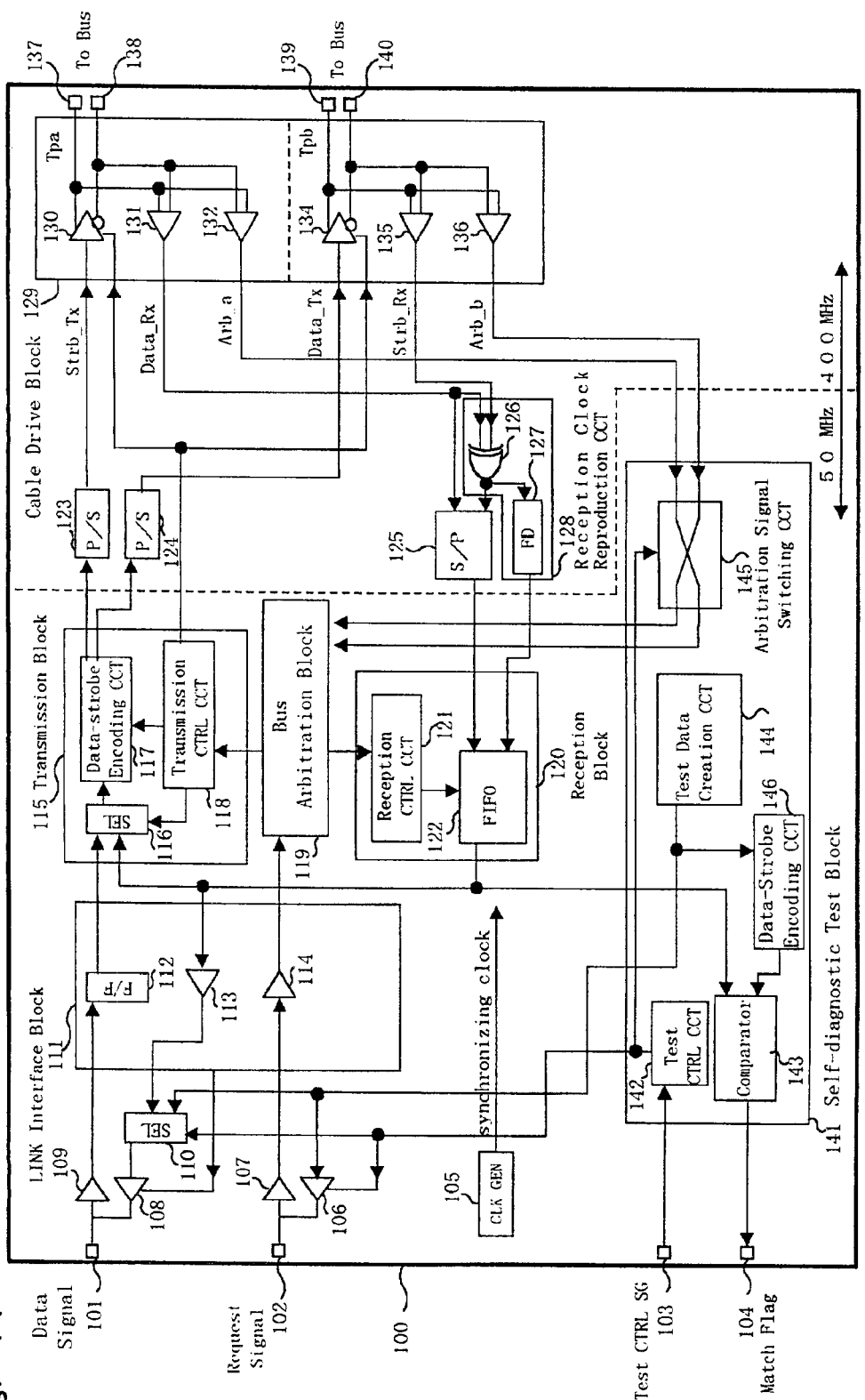
FIG. 14 is a block diagram of the communication control circuit of a first embodiment of the present invention.

FIG. 14 is a block diagram of a communication control circuit according to the first embodiment of the present invention. The communication control circuit of this embodiment incorporates a self-diagnostic test circuit in an LSI of the PHY circuit of FIG. 7. Components in FIG. 14 having the same reference numbers as components in FIG. 7 have the same function as the components in FIG. 7.

Referring now to FIG. 14, communication control circuit 100 of the first embodiment of the present invention includes as its principal constituent elements: LINK interface block 111, cable drive block 129, transmission block 115, reception block 120, bus arbitration block 119, and self-diagnostic test block 141.

Communication control circuit 100 is further provided with P/S circuits 123 and 124 and S/P circuit 125 at the interface with serial data processor (cable drive block 129) and parallel data processor (blocks other than cable drive block 129). Communication control circuit 100 is also provided with local clock generation circuit (CLK GEN) 105 that generates local clocks for synchronizing the operation of the entire PHY circuit, and reception clock reproduction circuit 128 that generates a clock synchronized with the received data.

Communication control circuit 100 of the first embodiment of the present invention can be broadly divided between two speed blocks according to operation speed. The first speed block operates at 50 MHz and contains LINK interface block 111, bus arbitration block 119, transmission block 115, reception block 120, local clock generation circuit 105, and self-diagnostic test block 141. This speed block is hereinbelow referred to as "a 50 MHz-synchronized circuit."

The second speed block operates at 400 MHz and contains cable drive block 129, P/S circuits (123 and 124), S/P circuit 125, and reception clock reproduction circuit 128.

LINK interface block 111 serves for interfacing between the PHY circuit and the external LINK layer circuit (not shown in the figures). LINK interface block 111 is provided with D-Flip-flop (F/F) 112, which performs resynchronization of data signals 101 provided from a LINK layer with the local clock generated by local clock generation circuit 105, and supplies the resynchronized data to transmission block 115.

LINK interface block 111 also provides the received data that are processed by reception block 120 to LINK layer circuits by way of buffer 113.

Request signal 102 supplied from a LINK layer is transferred to bus arbitration block 119 by way of buffer 114.

Local clock generation circuit 105 is a clock source for supplying clocks for synchronizing all data signals in the 50 MHz-synchronized circuit.

Transmission block 115 is a block for transmitting data signals and is provided with selector circuit SEL 116, data-strobe encoding circuit 117, and transmission control circuit 118.

Transmission control circuit 118 receives transmission commands (Transmit commands or Repeat commands) from bus arbitration block 119 and sends a selection control signal to SEL circuit 116. In response to the selection control signal, SEL circuit 116 selects either packet data that have been supplied from LINK interface block 111 or the received data that have been supplied from FIFO 122 of reception block 120 and transmits the selected data to data-strobe encoding circuit 117.

Data-Strobe encoding circuit 117 performs processing to create a strobe signal (DS-LINK bit level encoding) from a supplied data signal, and if the right or priority to use the bus has been acquired, adds arbitration signals (TX_DATA_PREFIX and TX_DATA_END) at the beginning and end of the data signal and strobe signal in accordance with the control of transmission control circuit 118. In this way, a transmission strobe signal and a transmission data signal are created.

Strobe signals and data signals are sent from data-strobe encoding circuit 117 to P/S circuits 123 and 124, respectively, which perform the parallel to serial conversion. The serial data provided by P/S circuits 123 and 124 are supplied to cable drive block 129.

Cable drive block 129 includes drivers 130 and 134, which are tristate differential circuits of low-voltage and low current, receivers 131 and 135, and arbitration comparators 132 and 136 (hereinbelow abbreviated "Arb Comp"). The block 129 functions as an interface between the PHY circuit and the bus (twisted-pair cables or Tp cables) connected between the PHY circuit of interest and a PHY circuit of another node.

The transmission data signal Data_TX provided from P/S circuit 124 is supplied to driver 134 of the twisted pair B drive block (TPB drive block) of cable drive block 129. If the right to use the bus has been acquired, the serial data signal is supplied to the bus.

Similarly, the transmission strobe signal Strb_Tx provided from P/S circuit 123 is supplied to driver 130 of the twisted pair A (Tpa) drive block (TPA drive block) of cable drive block 129, and is supplied to the bus.

The differential outputs of drivers 130 and 134 are supplied to receivers 131 and 135 and Arb Comp 132 and 136, respectively, of the same cable drive block 129 as well.

Arb Comp 132 and 136 of cable drive block 129 detect the arbitration signal portions of the outputs of drivers 130 and 134, respectively, and the outputs of the arbitration comparators, Arb_a, Arb_b, are supplied by way of arbitration signal switching circuit 145 (to be explained hereinbelow) to bus arbitration block 119.

Bus arbitration block 119 judges the bus state according to the combination of output signal Arb_b of Arb Comp 136 of the twisted pair B drive block and output signal Arb_a of Arb Comp 132 of the twisted pair A drive block and transmits bus control signals to transmission block 115 and reception block 120 to control the operation of the PHY circuit.

Receivers 131 and 135 of cable drive block 129 detect packet data that are received from buses. Received data signal Data_Rx of receiver 131 is supplied to S/P circuit 125. Received data signal Data RX of receiver 131 and received strobe signal Strb_RX of receiver 135 are provided to reception clock reproduction circuit 128.

In the normal operation mode, Data_Rx is the data signal that is transmitted from another node, but in the self-diagnostic test mode to be explained hereinbelow, Data_Rx is strobe data signal Strb_TX that is transmitted from driver 130 of cable drive block 129 of inerest. Similarly, Strb_RX is the strobe signal that is transmitted from another node in the normal operation mode, but in the self-diagnostic test mode to be explained, it is data signal Data_TX that is transmitted from driver 134 of cable drive block 129 of interest.

Reception clock reproduction circuit 128 is constituted by exclusive-OR circuit 126 and frequency demultiplier 127, produces a clock from the exclusive-OR of data signal Data_RX and strobe signal Strb_RX, and supplies this clock to S/P circuit 125 as a timing clock for conversion.

Frequency demultiplier 127 frequency-demultiplies (from 400 MHz to 50 MHz) the output clock of exclusive-OR circuit 126 and generates reception reproduction clocks. The reception reproduction clocks are supplied to FIFO 122 as timing clocks for writing.

Reception block 120 is provided with reception control circuit 121 and FIFO 122. Reception control circuit 121 receives commands provided from bus arbitration block 119 and controls the reception of parallel Data_RX that has been converted from serial data to parallel data at S/P circuit 125.

If the command is a Receive command, the parallel Data_RX is written to FIFO 122 at the timing of the reception reproduction clocks.

Since IEEE Standard 1394 adopts half-duplex communication mode in normal communication mode, only one PHY circuit of two interconnected PHY circuits is able to perform data communication. Thus, as described hereinabove with reference to FIG. 7, the operation of a PHY circuit in normal operation is limited to either transmission or reception.

The communication control device of the present invention is provided with self-diagnostic test block 141 for the above-described self-diagnostic test of data processing.

Self-diagnostic test block 141 of the present embodiment is provided with test data creation circuit 144, comparison circuit 143, test control circuit 142, data-strobe encoding circuit 146, and arbitration signal switching circuit 145.

Test control circuit 142 generates an operation mode switching signal in response to test control signal (Test CTRL SG) 103 to switch between test operation and normal operation of the PHY circuit.

Test data creation circuit 144 creates transmission commands and data for test purposes.

The transmission commands are provided from test data creation circuit 144 by way of output buffer 106 to input buffer 107 of request signals 102. Output buffer 106 is output-enabled during the self-diagnostic test operation by the operation mode switching signal. Thus, during self-diagnostic test operation, transmission commands are supplied by way of LINK interface block 111 to bus arbitration block 119, similar to request signal 102 during normal operation. As a result, bus control signals are supplied from bus arbitration block 119.

Test data created by test data creation circuit 144 are given to selector circuit (SEL) 110. In addition to the test data, parallel Data_RX that have been read from FIFO 122 in synchronization with synchronizing clocks generated by local clock generation circuit 105 are supplied to selector circuit SEL 110 by way of buffer 113 of LINK interface block 111. In response to the operation mode switching signals, SEL 110 selects the output of FIFO 122 in normal operation mode and selects test data in self-diagnostic test mode.

Test data that have been thus selected by SEL 110 are supplied from F/F 112 to data-strobe encoding circuit 117 in accordance with the control of transmission control circuit 118.

The contents of FIFO 122, i.e., parallel Data_RX, are data signals that have been transmitted from other nodes during normal operation mode, but the strobe signals transmitted from driver 130 during a self-diagnostic test.

It is to be noted that the self-diagnosis test of the present invention is performed with TPA and TPB terminals disjointed from the twisted pair cables.

The test data are also supplied to data-strobe encoding circuit 146 in self-diagnostic test block 141 as well and are converted to a strobe signal in data-strobe encoding circuit 146.

The converted strobe signals are supplied to comparison circuit 143 as expected value signals.

Comparison circuit 143 compares expected value signals with the data read out from FIFO 122, determines whether the values of the signals match or not, and notifies the results by flags 104.

Arbitration signal switching circuit 145 is constituted by a selector circuit, and in accordance with the switching control of the operation mode switching signals, exchanges arbitration control signals Arb_a and Arb_b and supplies the exchanged arbitration control signals to bus arbitration block 119.

As explained with reference to FIGS. 4 and 5, during normal operation, TX_DATA_PREFIX and RX_DATA_END correspond to an identical set of arbitration control signals (Arb_a=0 and Arb_b=1). This causes bus arbitration block 119 to judge TX_DATA_PREFIX to be Rx_Data_End. Bus arbitration block 119 consequently deactivates FIFO 122, and the feedback of packet data during transmission of packet data is thus prevented.

During self-diagnostic test operation, however, Arb_a and Arb_b are exchanged, and TX_DATA_PREFIX is judged by bus arbitration block 119 to be Rx_Data_Prefix. Bus arbitration block 119 therefore activates FIFO 122. The feedback of packet data during transmission of packet data is thus enabled. A loopback test can therefore be executed.

The SEL, FIFO, P/S circuit, and S/P circuit that are used in the first embodiment of the present invention are known to those skilled in the art or are not directly related to the present invention, and details regarding the constitution of these components is therefore omitted.

Figure 15:
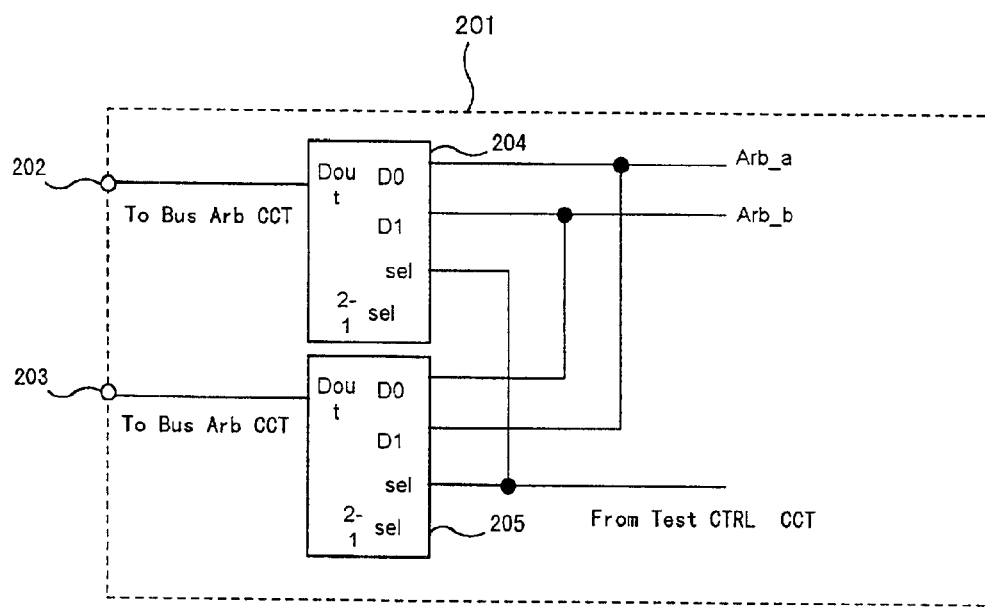
FIG. 15 is a block diagram of the arbitration signal line switching circuit of the communication control circuit shown in FIG. 14.

FIG. 15 is a block diagram of one working example of arbitration signal switching circuit 145. Arbitration signal switching circuit 201 is provided with 2-1 selectors 204 and

205, and selects and sends out either of input D0 or D1 of 2-1 selectors 204 and 205 according to an operation mode switching signal provided by test control circuit 142. Output signal Arb_a of Arb Comp 132 is received at the D0 terminal of selector 204 and the D1 terminal of selector 205, and output signal Arb_b of Arb Comp 136 is received at the D1 terminal of selector 204 and the D0 terminal of selector 205.

In accordance with the switching control of operation mode switching signals, input signals to both D0 terminals are selected and supplied in normal operation mode. During a self-diagnostic test, however, input signals to both D1 terminals are selected and supplied. Arb_a and Arb_b can thus be exchanged and applied to bus arbitration block 119 during a self-diagnostic test.

Figure 1:
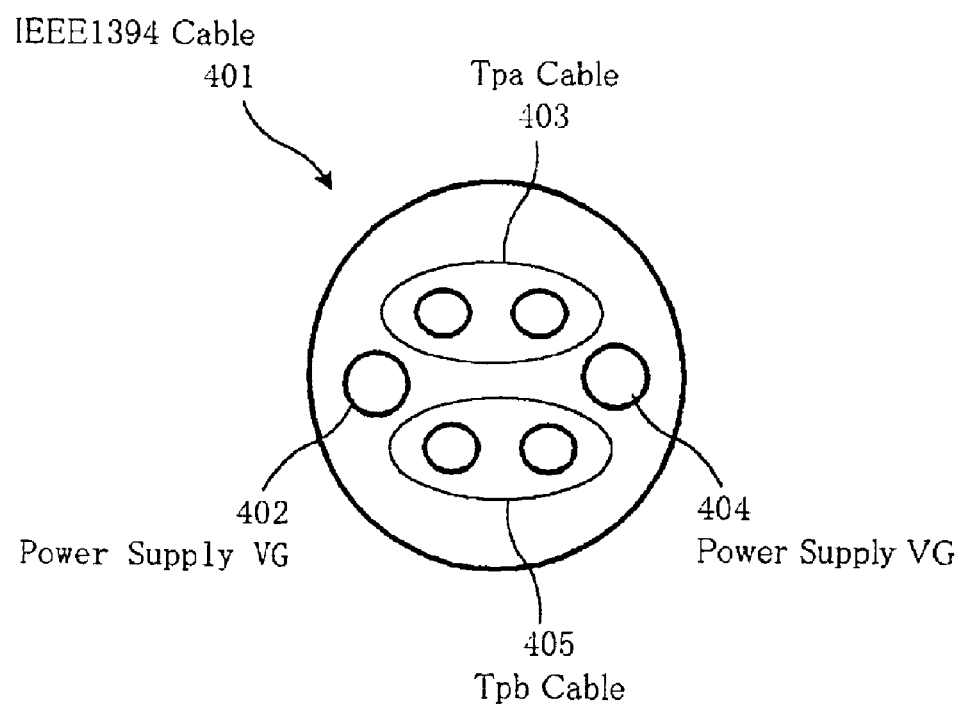
FIG. 1 is a sectional view of an IEEE 1394 cable.
Figure 2:
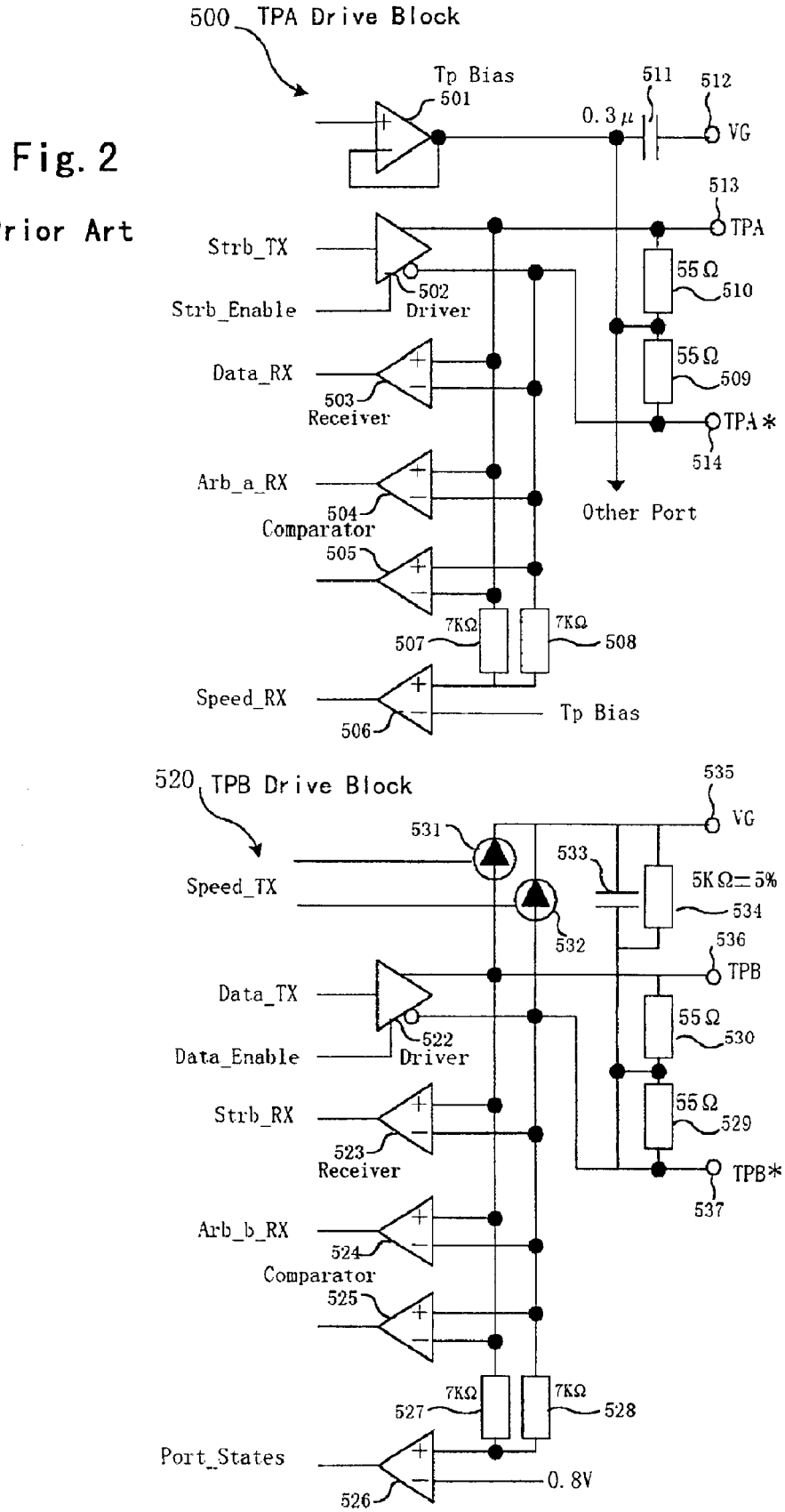
FIG. 2 is a block diagram of a cable drive block of a PHY circuit.
Figure 3:
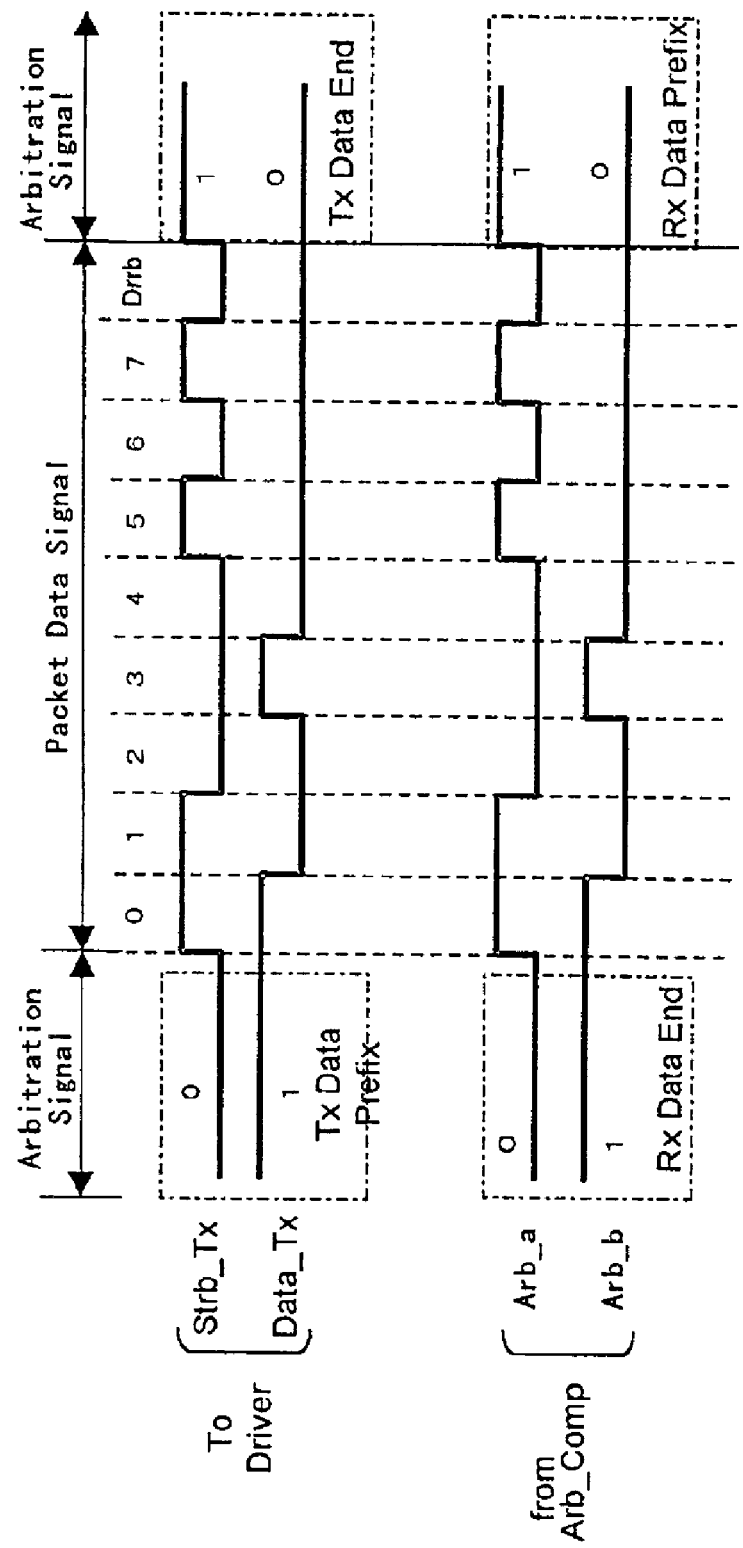
FIG. 3 is a timing chart showing operation during normal packet transmission.

Next, regarding the operation of the first embodiment of the present invention, a normal packet transmission operation of the first embodiment of the present invention is first explained with reference to FIG. 3.

PHY 100, having received a transmission request from a LINK layer (not shown in the figure), transmits TX_DATA_PREFIX to the bus and notifies the transmission of packets to other nodes if the right to use the bus has been acquired, and other nodes that detect TX_DATA_PREFIX halt the sending of transmission requests (TX-REQUEST).

The previously described processing is then executed to transmit packet data to the bus.

Arbitration control signals that are generated by feedback of this TX_DATA_PREFIX within cable drive block 129 are identical to the arbitration control signals corresponding to the arbitration signal Rx_DATA_END. Bus arbitration block 119 therefore controls reception control circuit 121 in reception block 120 to deactivate FIFO 122. A reception operation is therefore not carried out, and packet data that are transferred on the bus are not received by the same port.

Figure 6:
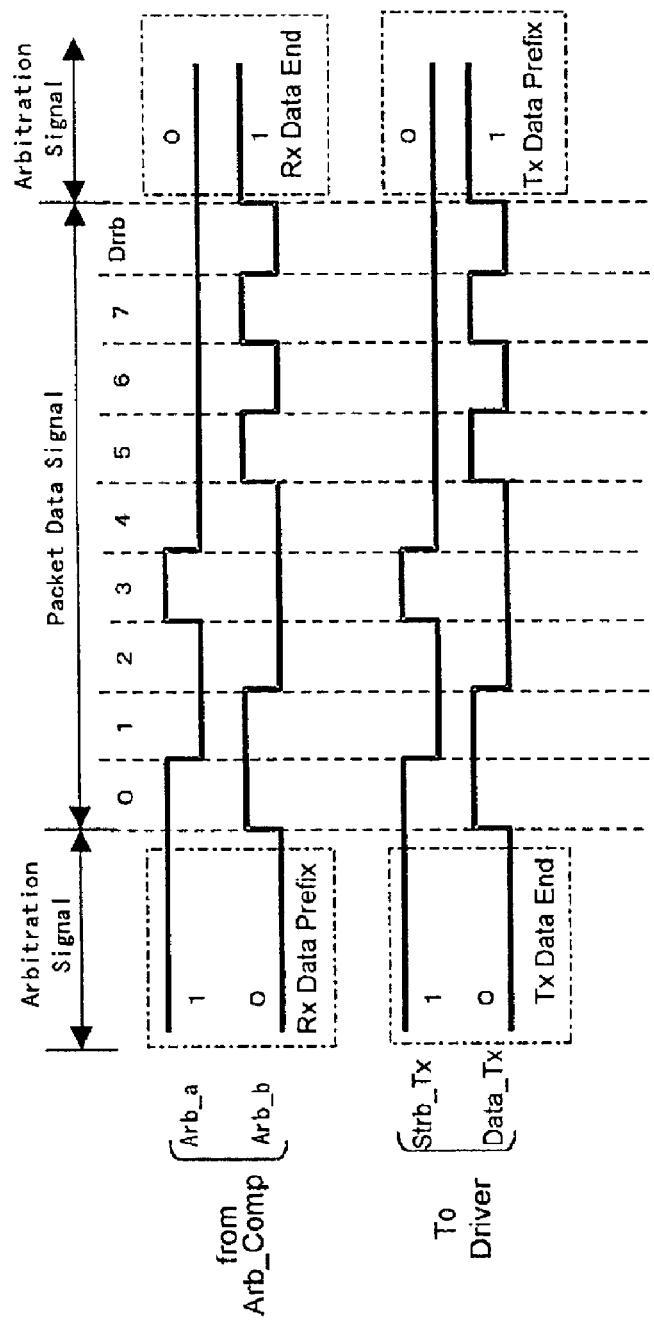
FIG. 6 is a timing chart showing operation during normal packet reception.

The packet receiving operation of the first embodiment of the present invention is next explained with reference to the timing chart shown in FIG. 6.

The reception operation begins with the detection by the bus arbitration block of arbitration signal Rx_Data_PREFIX received from the bus. The reception block is next activated, and the above-described processing is executed. At this time, in a case in which the node of interst is provided with ports other than the receiving port concerned and the receiving port and the ports other than the receiving port are connected by Tp cables, the received packet data are repeated to the Tp cable by way of the transmission block.

Figure 16:
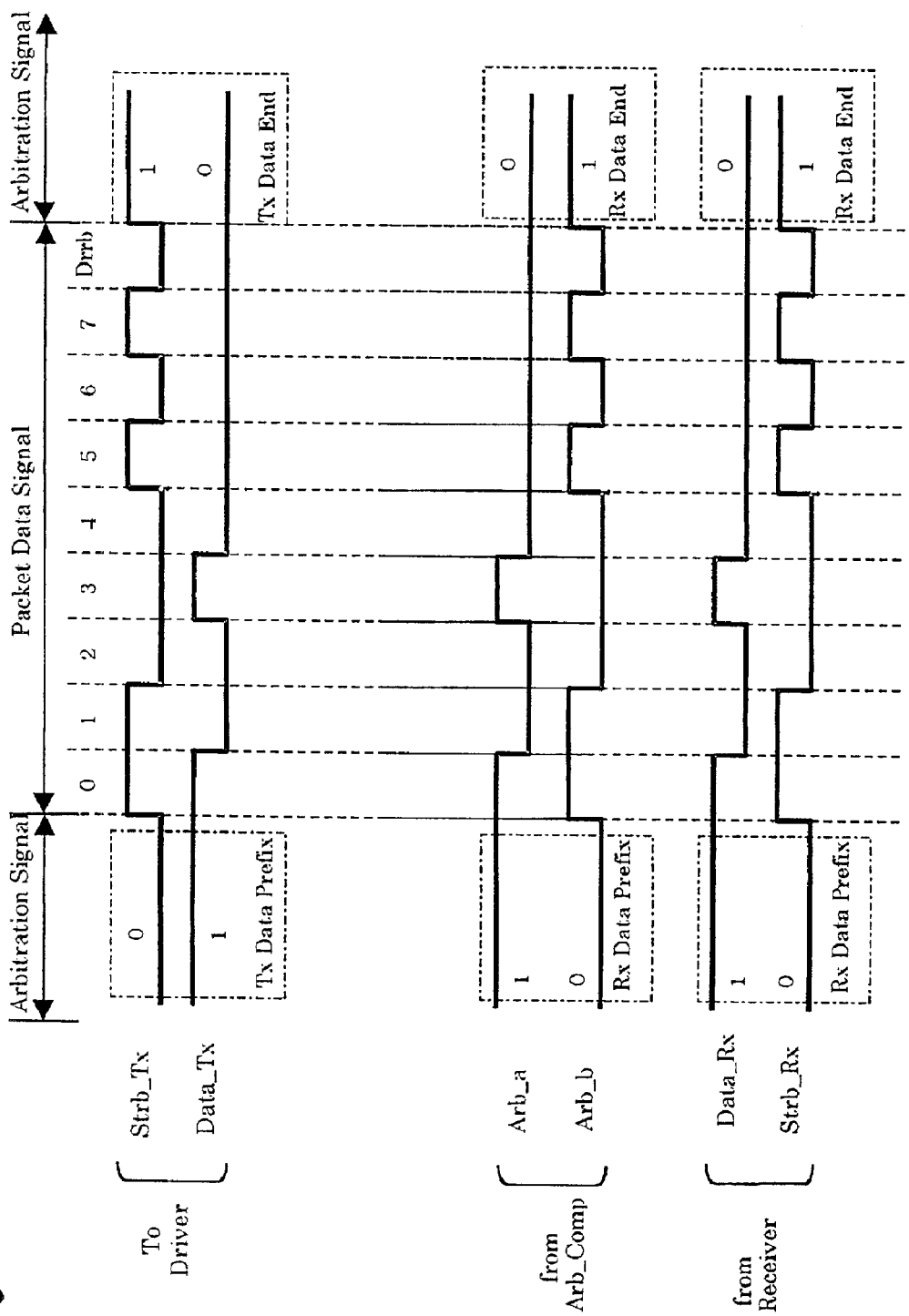
FIG. 16 is a timing chart showing operation during a test.

The operation of the first embodiment of the present invention during a self-diagnostic test is next explained with reference to FIG. 16. FIG. 16 is a timing chart of packet transmission and reception during a self-diagnostic test.

A test data signal created in self-diagnostic test block 141 is supplied by way of LINK interface block 111 to transmission block 115, and the above-described transmission process is executed on the test data signal.

In the self-diagnostic test operation, however, arbitration control signal Arb_a of the twisted pair A drive block and arbitration control signal Arb_b of the twisted pair B drive block that have been looped back are exchanged and the exchanged arbitration control signals are supplied to bus arbitration block 119 by means of arbitration signal switching circuit 145 in self-diagnostic test block 141.

As a result, bus arbitration block 119 recognizes TX_DATA_PREFIX as arbitration signal Rx_Data_PREFIX, whereby the above-described receiving operation is executed.

Accordingly, strobe signals that are fed back from the twisted pair A drive block of cable drive block 129 are written to FIFO 122, synchronized to clock signals supplied from reception clock reproduction circuit 128, through the path of receiver 131 for data signal Data_RX and S/P circuit 125.

After clock skew is buffered at FIFO 122, the test data signals read out from FIFO 122 are supplied to comparison circuit 143. On the other hand, test data signals created at test data creation circuit 144 are converted to strobe signals at data-strobe encoding circuit (expected value data creation circuit) 146, synchronized with the timing at which FIFO 122 is read (the timing of the synchronizing clock), and supplied to comparison circuit 143 as expected value data.

Comparison circuit 143 compares the looped-back strobe signals and the expected value data of the created strobe signal, and provides the comparison results as output flag signals, thereby enabling a check of whether the transmission operation and reception operation are normal.

Figure 17:
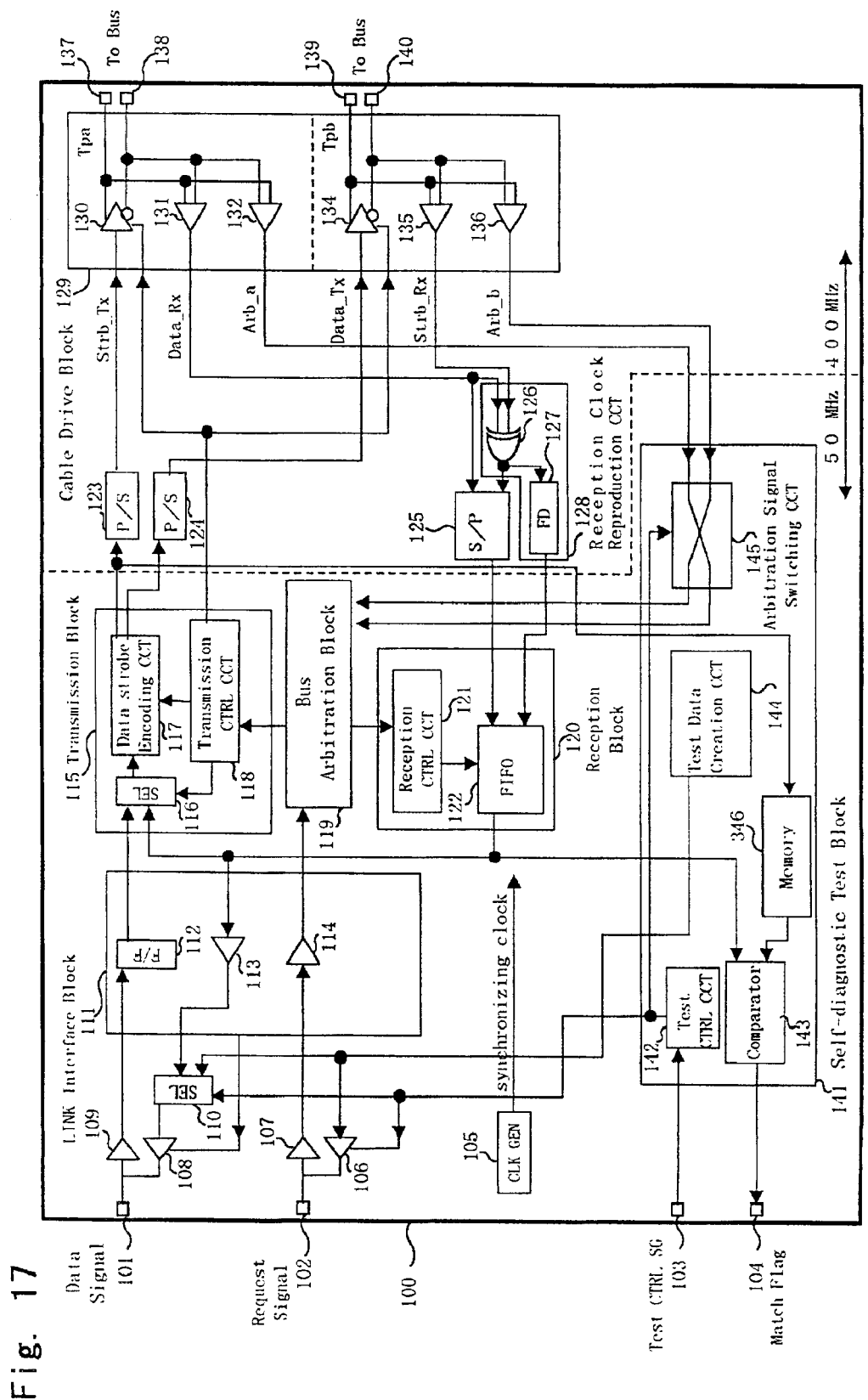
FIG. 17 is a block diagram of the communication control circuit of a second embodiment of the present invention.

FIG. 17 is a block diagram of the second embodiment of the present invention. This embodiment differs from the previously described first embodiment in that, in place of data-strobe encoding circuit 146 of self-diagnostic test block 141, this embodiment is provided with memory circuit 346 for storing the output of data-strobe encoding circuit 117 of transmission block 115. The present embodiment is otherwise of the same constitution as the first embodiment described above, and identical constituent elements are identified by the same reference numerals.

Memory circuit 346 that can store strobe data signals is provided in place of data-strobe encoding circuit 146 of self-diagnostic test block 141 of FIG. 14, and strobe data signals that are provided from the transmission block are stored in memory circuit 346, and the output of memory circuit 346 is supplied to comparison circuit 143.

Since the expected value data of the first embodiment are the same as the strobe signals created from data signals to be transmitted, processing similar to the above-described first embodiment of the present invention is realized by storing strobe signals that are created by data-strobe encoding circuit 117 of transmission block 115 in FIG. 17 in memory circuit 346 of FIFO construction and then reading out the data signals at a timing synchronized with the comparison timing. A detailed explanation of this embodiment is therefore omitted.

Needless to say, this embodiment is also capable of checking whether or not the operation of the PHY circuit is normal.

The above-described embodiments are intended for implementing the method of self-diagnosing a physical layer circuit in conformity with IEEE Standard 1394.

Figure 18:
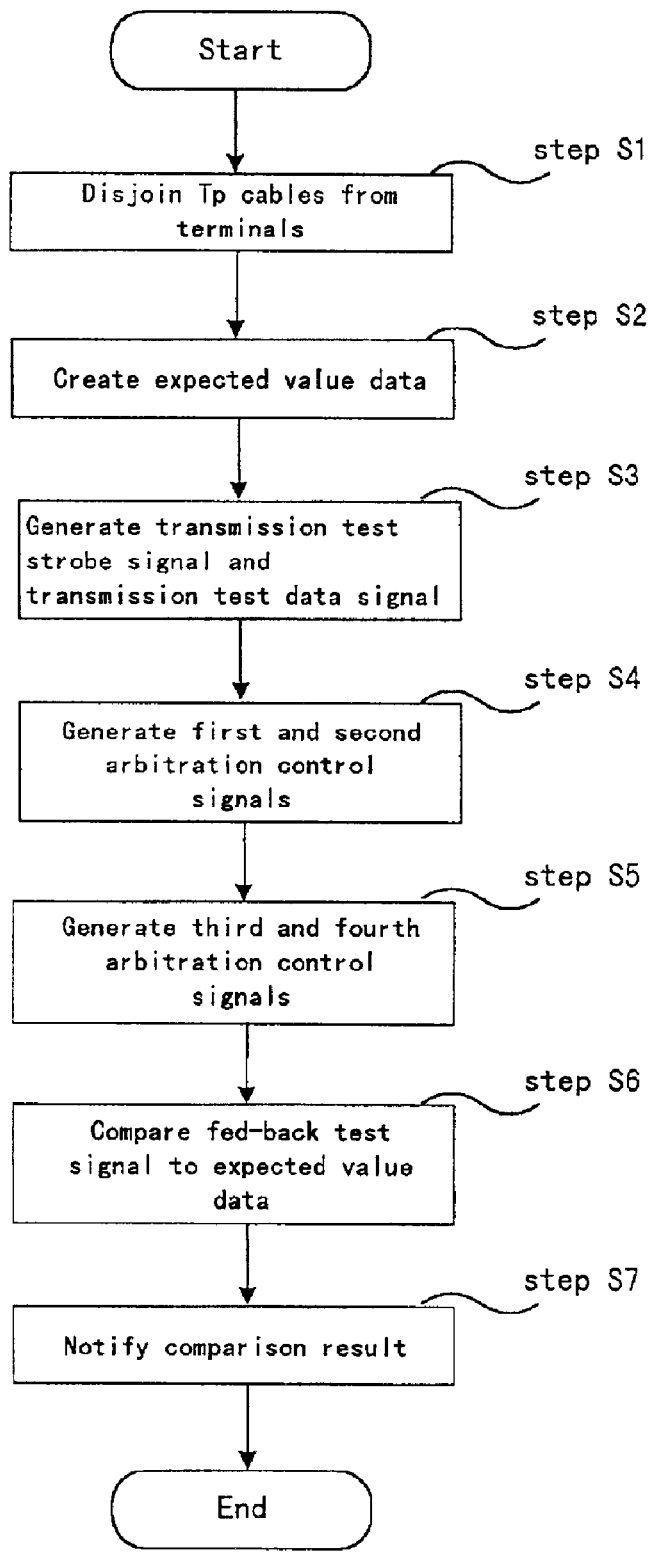
FIG. 18 is a flow chart illustrating fundamental procedures of the self-diagnosing method according to the present invention.

FIG. 18 is a flow chart to illustrate the fundamental procedures of the method.

Referring to FIG. 18, the method comprises steps of: disjoining the IEEE 1394 twisted pair cable from communication terminals of the physical layer circuit (Step S1); creating expected value data signals by means of data-strobe coding circuit 146 or memory 346, wherein the expected value data signals are the signals that are expected to be caused in the case in which test data signals are subject to the same processing as in the normal operation mode of the physical layer circuit without any error (Step S2); creating a test strobe signal from a test data signal by DS-LINK bit level encoding, and generating a transmission test strobe signal and a transmission test data signal by adding arbitration signals to the test strobe signal and the test data signal, respectively, by means of data-strobe encoding circuit 117 (Step S3); transmitting the transmission test strobe signal and the transmission test data signal through the first driver and the second driver of the physical layer circuit, and creating a first arbitration control signal and a second arbitration control signal from the outputs of the first driver and the second driver by means of arbitration comparators 132 and 136 by the same processing of the arbitration signals as the corresponding processing in the normal operation mode of the physical layer circuit of interest (Step S4); processing the first arbitration control signal and the second arbitration control signal to produce a third arbitration control signal and a fourth arbitration control signal by means of arbitration signal switching circuit so that the line state specified by a set of the third and fourth arbitration control signals will permit, in accordance with the Specification of the IEEE 1394 Standard, predetermined one of the outputs of the first receiver and the second receiver to feedback, as a fed-back test signal, to an internal signal-reception circuit of the physical layer circuit of interest through the same signal-reception processing as in the normal operation mode of the physical layer circuit (Step S5); comparing the fed-back test signal to the expected value data signal (Step S6) by means of comparator 143; and notifying the result of the comparing as a result of the self-diagnosis (Step S7).

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A communication control circuit having a physical layer circuit in conformity with IEEE Standard 1394, wherein said physical layer circuit is provided with: cable drive means for driving an IEEE 1394 cable pursuant to said IEEE Standard 1394 and receiving a signal from said cable, said cable drive means having first and second cable drive means for driving first and second twisted pair cables of said IEEE 1394 cable, said first cable drive means having first terminals for communicating with said first twisted pair cable, first driver for driving said first twisted pair cable through said first terminals, first receiver for receiving signals applied to said first terminals, and a first arbitration comparator for detecting a state of a line connected with said first terminals, the result of detection being a first arbitration control signal, and said second cable drive means having second terminals for communicating with said second twisted pair cable, a second driver for driving said second twisted pair cable through said second terminals, second receiver for receiving signals applied to said second terminals, and a second arbitration comparator for detecting a state of a line connected with said second terminals, the result of detection being a second arbitration control signal; bus arbitration means for controlling transmission and reception of packet data to manage bus arbitration in accordance with said IEEE Standard 1394 based on said first and second arbitration control signals;

transmission means for generating a transmission strobe signal and a transmission data signal to transmit through said first and second drivers respectively under control of said bus arbitration means; and reception means for receiving outputs of said first and second receivers under control of said bus arbitration means and supplying predetermined one of said outputs of said first and second receivers as an output; and wherein said physical layer circuit is further provided with a self-diagnosis circuit for diagnosing said physical layer circuit, said self-diagnosis circuit comprising:

a test data creation circuit for creating a test data signal and a transmission command; reference means for providing expected value data signals, said expected value data signals being signals that are expected to be caused in the case in which test data signals are subject to the same processing as in the normal operation mode of said physical layer circuit without any error; a comparison circuit for comparing output of said reference means with output of said reception means and notifying the results of the comparison; a test control circuit for providing an operation mode switching signal in accordance with an externally supplied test control signal for commanding execution of a self-diagnostic test; an arbitration signal switching circuit that receives first and second arbitration signals, and, when said operation mode switching signal designates the test operation mode, exchanges the values of the first and second arbitration signals and supplies the result to said bus arbitration means; and selector means;

said selector means including: an output control circuit for transferring said transmission commands to said bus arbitration means when said operation mode switching signal designates the test operation mode and blocking transmission of said transmission commands to said bus arbitration means when said operation mode switching signal designates the normal operation mode; and a selection circuit for transferring said test data signal to said transmission means when said operation mode switching signal designates the self-diagnostic test mode, and blocking transmission of said test data signal when said operation mode switching signal designates the normal operation mode.

2. A communication control device as claimed in claim 1, wherein said predetermined one of said outputs is the output of said first driver which is received by said first receiver and said reference means is a data-strobe encoding circuit for performing data-strobe encoding of said test data signal.

3. A communication control device as claimed in claim 1, wherein said predetermined one of said outputs is the output of said first driver which is received by said first receiver and said reference means is a memory that stores said test strobe signal created by said transmission means.

4. A communication control device as claimed in claim 1, wherein said arbitration signal switching circuit is provided with a first 2-1 selector and a second 2-1 selector each for selecting either a first input or a second input according to an operation mode switching signal provided by said test control circuit, said first arbitration control signal is supplied to both said first input of said first 2-1 selector and said second input of said second 2-1 selector, said second arbitration control signal is supplied to both said second input of said first 2-1 selector and said first input of said second 2-1 selector, and the outputs of said 2-1 selectors are provided to said bus arbitration means.

5. A method of self-diagnosing a physical layer circuit configured in conformity with IEEE Standard 1394 provided with first and second drivers for driving an IEEE 1394 twisted pair cable through first and second terminals, respectively, and with first and second receivers for receiving signals applied to said first and second terminals, respectively, comprising steps of:

disjoining the IEEE 1394 twisted pair cable from communication terminals of said physical layer circuit creating expected value data signals, said expected value data signals being signals that are expected to be caused in the case in which test data signals are subject to the same processing as in the normal operation mode of said physical layer circuit without any error, creating a test strobe signal from a test data signal by DS-LINK bit level encoding, producing a transmission test strobe signal and a transmission test data signal by adding arbitration signals to said test strobe signal and said test data signal, respectively, transmitting said transmission test strobe signal and said transmission test data signal through said first driver and said second driver of said physical layer circuit, creating a first arbitration control signal and a second arbitration control signal from the outputs of said first driver and said second driver by the same processing of said arbitration signals as the corresponding processing in the normal operation mode of the physical layer circuit of interest, processing said first arbitration control signal and said second arbitration control signal to produce a third arbitration control signal and a fourth arbitration control signal so that the line state specified by a set of said third and fourth arbitration control signals will permit, in accordance with the Specification of the IEEE 1394 Standard, predetermined one of said outputs of said first receiver and said second receiver to feedback, as a fed-back test signal, to an internal signal-reception circuit of the physical layer circuit of interest through the same signal-reception processing as in the normal operation mode of the physical layer circuit, comparing the fed-back test signal to said expected value data signal, and notifying the result of the comparing as a result of the self-diagnosis.

6. A method according to claim 5, wherein a set of said first arbitration control signal and said second arbitration control signal specifies a line state that prohibits the feedback of said predetermined one of said outputs, and wherein the step of processing said first arbitration control signal and said second arbitration control signal includes a step of exchanging the values of said first arbitration control signal and said second arbitration control signal to replace said first arbitration control signal with said second arbitration control signal as said third arbitration control signal and also replace said second arbitration control signal with said first arbitration control signal as said fourth arbitration control signal.

7. A method as claimed in claim 6, wherein said first receiver and said second receiver provides, as outputs, said transmission test strobe signal and said transmission test data signal, respectively, said predetermined one of said outputs is a transmission test strobe signal, and said expected value data signal is a test strobe signal created from a test data signal by DS-LINK bit level encoding.

* * * * *